United States Patent
Burgstaler et al.

(10) Patent No.: US 7,040,191 B2
(45) Date of Patent: May 9, 2006

(54) DEVICE FOR ADJUSTING A ROTATIONALLY MOUNTED CONNECTING PIECE

(75) Inventors: Andree Burgstaler, Dielingen (DE); Jan Dütz, Damme (DE); Simone Papke, Osnabrück (DE)

(73) Assignee: ZF Lemförder Metallwaren AB, Dielingen (DE)

(*) Notice: Subject to any disclaimer, the term of this patent is extended or adjusted under 35 U.S.C. 154(b) by 6 days.

(21) Appl. No.: 10/477,672

(22) PCT Filed: Feb. 18, 2003

(86) PCT No.: PCT/DE03/00493

§ 371 (c)(1),
(2), (4) Date: Nov. 12, 2003

(87) PCT Pub. No.: WO03/075114

PCT Pub. Date: Sep. 12, 2003

(65) Prior Publication Data

US 2004/0139817 A1    Jul. 22, 2004

(30) Foreign Application Priority Data

Mar. 6, 2002 (DE) ............................. 102 09 720

(51) Int. Cl.
*G05G 1/14* (2006.01)

(52) U.S. Cl. ............................................. 74/512

(58) Field of Classification Search .................. 74/512, 74/513, 560
See application file for complete search history.

(56) References Cited

U.S. PATENT DOCUMENTS

| 5,351,573 | A | | 10/1994 | Cicotte |
| 5,676,220 | A | | 10/1997 | Dapsi et al. |
| 5,921,144 | A | * | 7/1999 | Williams et al. ............... 74/512 |
| 6,431,021 | B1 | * | 8/2002 | Djordjevic et al. ........... 74/512 |
| 6,619,155 | B1 | * | 9/2003 | Brock ......................... 74/512 |

(Continued)

FOREIGN PATENT DOCUMENTS

| DE | 2941345 | * 4/1981 | .................. 74/512 |
| DE | 42 30 980 | 3/1994 | |
| DE | 196 54 705 | 7/1997 | |

(Continued)

Primary Examiner—Chong H. Kim
(74) Attorney, Agent, or Firm—McGlew & Tuttle, P.C.

(57) ABSTRACT

A device is provided for adjusting a connecting piece (6) mounted rotatably by a mounting device (5). The connecting piece is particularly part of a pedal mechanism of a motor vehicle coupled with a transmission unit (7) for transmitting the movement of the connecting piece (6). An adjusting mechanism (4) is provided for adjusting the position of the connecting piece (6). A locking unit prevents the unintentional adjustment of the connecting piece (6). The mounting device (5) comprises a bearing shell (3) and a baseplate (1). The bearing shell (3) is movably connected to the baseplate (1) arranged stationarily at the vehicle. The bearing shell (3) can be moved along the baseplate (1) upon the loosening of the locking unit such that the position of the transmission unit (7) coupled with the connecting piece (6) remains unchanged during the adjustment of the connecting piece (6) mounted in the mounting device (5), so that the adjusting mechanism (4) is integrated within the mounting device (5).

5 Claims, 6 Drawing Sheets

U.S. PATENT DOCUMENTS

| | | | |
|---|---|---|---|
| 6,658,964 B1 * | 12/2003 | Bang .......................... | 74/512 |
| 2001/0047696 A1 | 12/2001 | Fukase et al. | |
| 2002/0023516 A1 | 2/2002 | Frobel et al. | |
| 2002/0038577 A1 | 4/2002 | Bialk et al. | |
| 2004/0226398 A1 * | 11/2004 | Burgstaler et al. ............ | 74/512 |
| 2004/0231452 A1 * | 11/2004 | Burgstaler et al. ............ | 74/560 |

FOREIGN PATENT DOCUMENTS

| | | |
|---|---|---|
| DE | 692 30 859 | 10/2000 |
| DE | 199 23 697 | 11/2000 |
| DE | 100 33 342 | 11/2001 |
| DE | 100 26 751 | 12/2001 |
| DE | 100 28 591 | 12/2001 |

* cited by examiner

DEVICE FOR ADJUSTING A ROTATIONALLY MOUNTED CONNECTING PIECE

FIELD OF THE INVENTION

The present invention pertains to a device for adjusting a connecting piece mounted rotatably by means of a mounting means, especially a pedal mechanism in a motor vehicle, with which a transmission unit for transmitting the movement of the connecting piece is coupled, comprising an adjusting mechanism for adjusting the position of the connecting piece, and a locking unit, which prevents the unintentional adjustment of the connecting piece.

BACKGROUND OF THE INVENTION

Such devices are usually used in motor vehicles, especially in passenger cars, for adjusting control pedals such as brake, clutch and gas pedals. Even though many components, such as the seat, the steering wheel, etc., can already be adjusted corresponding to the body measurements of the operator in passenger cars, solutions for adjusting the pedals, which are among the vehicle components used most frequently, are rare. To guarantee an optimal adaptation of the vehicle to the individual and different body measurements of the operators, it is desirable to also make the pedals individually adjustable, corresponding to ergonomic considerations and guidelines and thus to guarantee fatigue-free and safe driving.

A solution in which the translatory and/or rotatory adjustment of a connecting piece is achieved via a separate adjusting mechanism has been known from DE 100 26 751 A1. A connecting piece in the sense of the present invention is defined especially as a pedal of a motor vehicle, more precisely a gas pedal, a brake pedal or a clutch pedal.

The prior-art device has the drawback that a large number of components are needed for adjusting the connecting piece. In particular, a compensating unit is additionally needed, which guarantees that the transmission of the force from the connecting piece via the transmission unit to the force transmission unit connected to the connecting piece remains nearly unchanged. This means a great assembly effort.

A device in which the adjustment of a connecting piece is performed by means of a separate adjusting mechanism is likewise known from DE 692 30 859 T1. The adjusting mechanism is designed eccentrically according to DE 692 30 859 T1.

This prior-art solution likewise has the drawback that the adjustment takes place via a separate component, a separate cam. Thus, additional space is needed for installation besides a great effort.

DE 196 54 705 A1 discloses another device for adjusting connecting pieces. The adjustment is performed here jointly for all connecting pieces via a frame.

The drawback of this prior-art solution is that only all connecting pieces together can be adjusted, and they cannot be adjusted individually.

SUMMARY OF THE INVENTION

The object of the present invention is therefore to provide a device in which the connecting pieces can be adjusted both together and one by one, i.e., individually, and the adjusting mechanism has the most compact design possible because of the only limited space available for installation, and it can be operated in a simple manner, and the forces needed to transmit the movement of the connecting piece to the force transmission unit connected to the transmission unit remains essentially unchanged compared with the preset value.

Based on a device according to the preamble of claim 1, this object is accomplished in conjunction with the characterizing features of that claim. Advantageous variants of the present invention are described in the dependent claims.

The present invention includes the technical teaching that the mounting means, which comprises a bearing shell and a baseplate, connects the bearing shell movably to the baseplate arranged stationarily in the vehicle. After the loosening of the locking unit, the bearing shell can be moved along the baseplate such that the position of the transmission unit coupled with the connecting piece remains unchanged during the adjustment of the connecting piece mounted in the mounting means. The adjusting mechanism is thus integrated within the mounting means.

This solution offers the advantage that the adjusting mechanism is integrated in the mounting means, and a complex compensating device is eliminated due to the fact that a guide groove of the adjustable mounting means is formed in a baseplate. An extremely compact design can thus be obtained. Direct and simple adjustment can be achieved due to a drive unit, which is integrated within the locking unit.

According to a measure which improves the present invention, the transmission unit may be a push rod of a force transmission unit of a motor vehicle. The push rod is connected to the connecting piece, e.g., via a push rod bolt.

Furthermore, it is proposed that the guide groove of the baseplate be designed such that the mounting means is pivotable around the connection axis between the connection unit and the connecting piece after the locking unit is loosened. A simple adjusting mechanism can be obtained as a result.

A further improvement is that the transmission unit is designed such that slight angular deviations from the preset axis in the range of 0° to 3° are permissible without a disadvantageous change in the advantage of the transmission.

However, it is also advantageous if the mounting means has a shell-like area, which is mounted movably on the baseplate and in the guide groove of the baseplate. A compact design of an adjusting mechanism can thus be achieved.

Furthermore, the adjusting mechanism may have a drive unit, via which the bearing shell can be moved manually or mechanically after loosening the locking unit. The adjusting mechanism can thus be automated as well as adjusted manually, so that reliable and permanently available actuation as needed is guaranteed.

Moreover, it is advantageous that the locking means is embodied by a positive-locking and/or nonpositive self-locking of a drive unit. The locking means can thus be integrated in the drive unit, as a result of which the entire device requires little space for installation.

Furthermore, it is advantageous if one or more connecting pieces arranged on the baseplate can be moved by means of the drive unit. The individual setting can thus be made comfortable and simple for the operator.

Further advantageous embodiments will be explained in greater detail on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
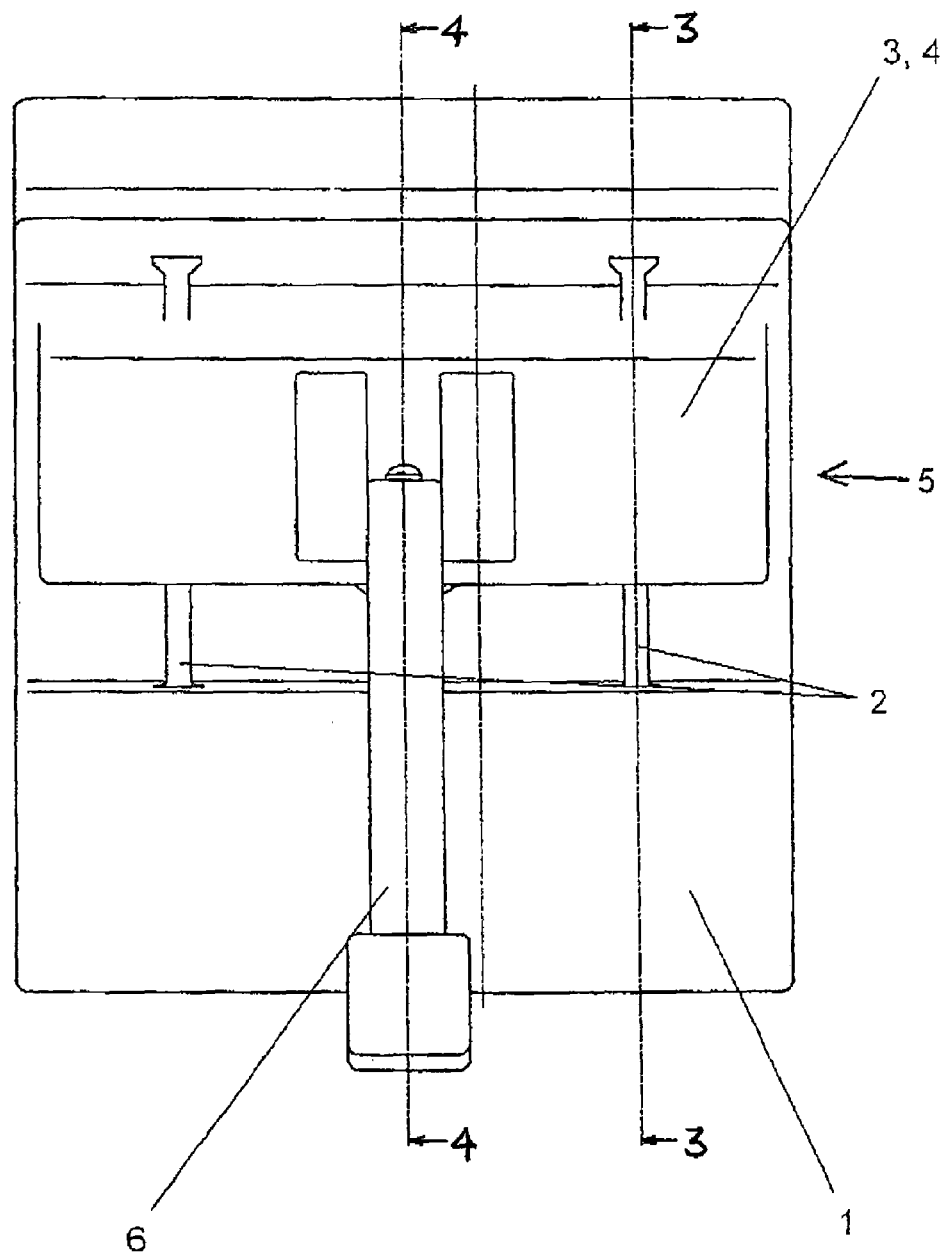
FIG. 1 is a top view of the adjusting device according to the invention.

Referring to the drawings in particular, FIG. 1 shows the baseplate 1, in which two guide grooves 2, which are designed essentially as a dovetail section, are located. An adjustable bearing shell 3, mounted movably, is located with projections 13 in the guide grooves 2. The bearing shell 3 also acts at the same time as part of an adjusting unit 4, which is integrated within a mounting device or mounting means 5. The actuator connecting piece 6 designed as a pedal is mounted rotatably in the mounting means 5. The actuator connecting piece 6 has a actuatable portion 12 in the form of a foot pedal. The connecting piece 6 is mounted in a central intermediate space of the bearing shell 3, which space is designed as a gap.

Figure 2:
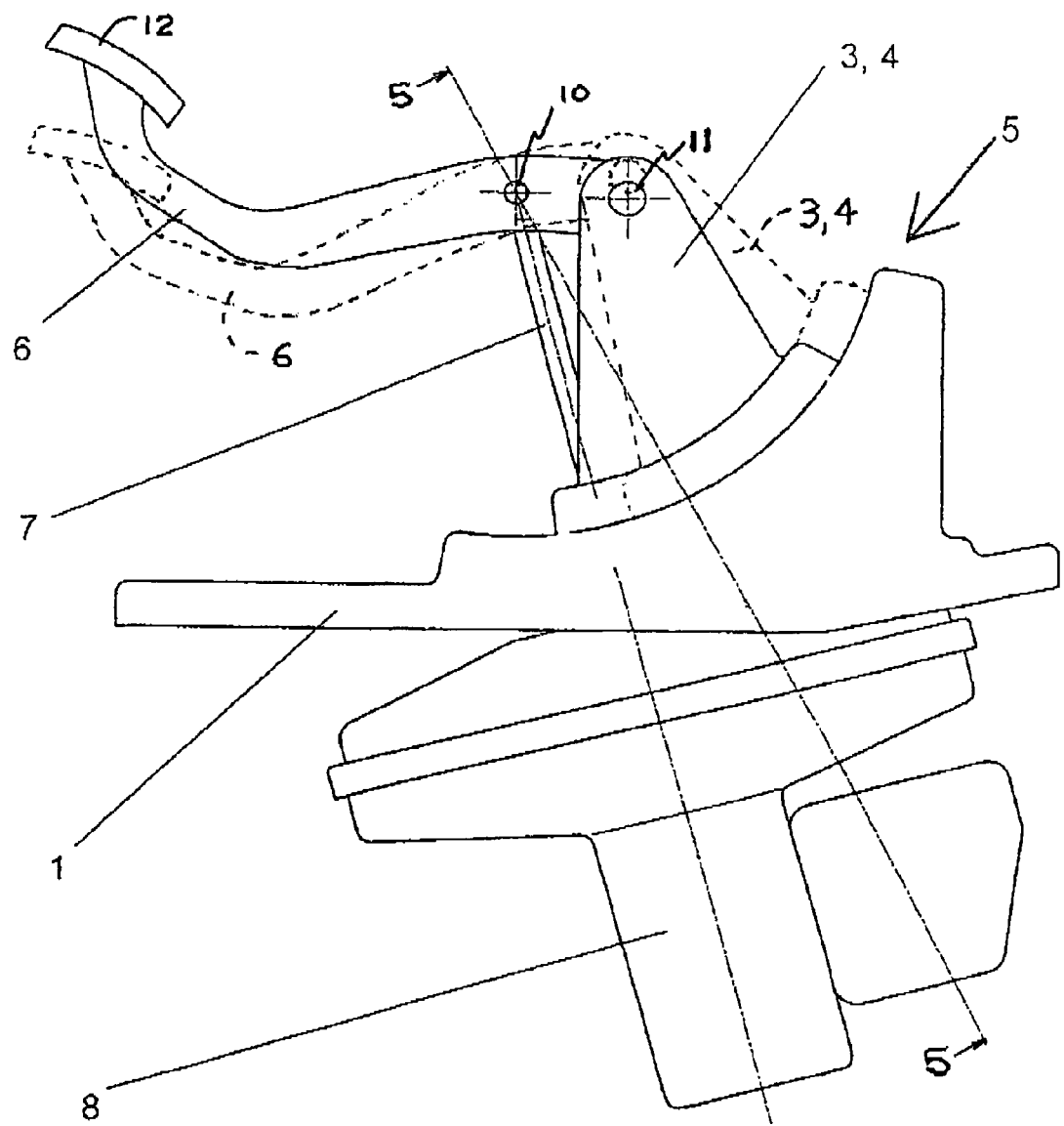
FIG. 2 is a side view of the adjusting device.

FIG. 2 shows the section of the baseplate 1. The baseplate 1 has an elevation, which has an area bulged radially around the axis of the connection bolt, which connects the transmission unit 7 and the connecting piece 6. The guide grooves 2 are arranged recessed along this outer contour of the bulged area of the elevation of the baseplate 1 (cf. FIG. 3). The adjustable bearing shell 3 is movable on this contour corresponding to the recessed guide grooves 2. The bearing shell 3 has a hole 11 located at a spaced location from the axis of the connection bolt 10 of the transmission unit 7 and the connecting piece 6 for mounting the connecting piece 6. Due to this distance, the movable bearing shell 3 acts as part of an eccentric adjusting mechanism 4, as a result of which the adjustment is achieved. A force transmission unit 8, which amplifies and transmits the force, which is to be transmitted by the movement of the connecting piece 6 and sent from the transmission unit 7 to the force transmission unit 8, is located in the axial extension of the transmission unit 7 at the end of the transmission unit 7, which end is located at a spaced location from the connecting piece 6.

Figure 3:
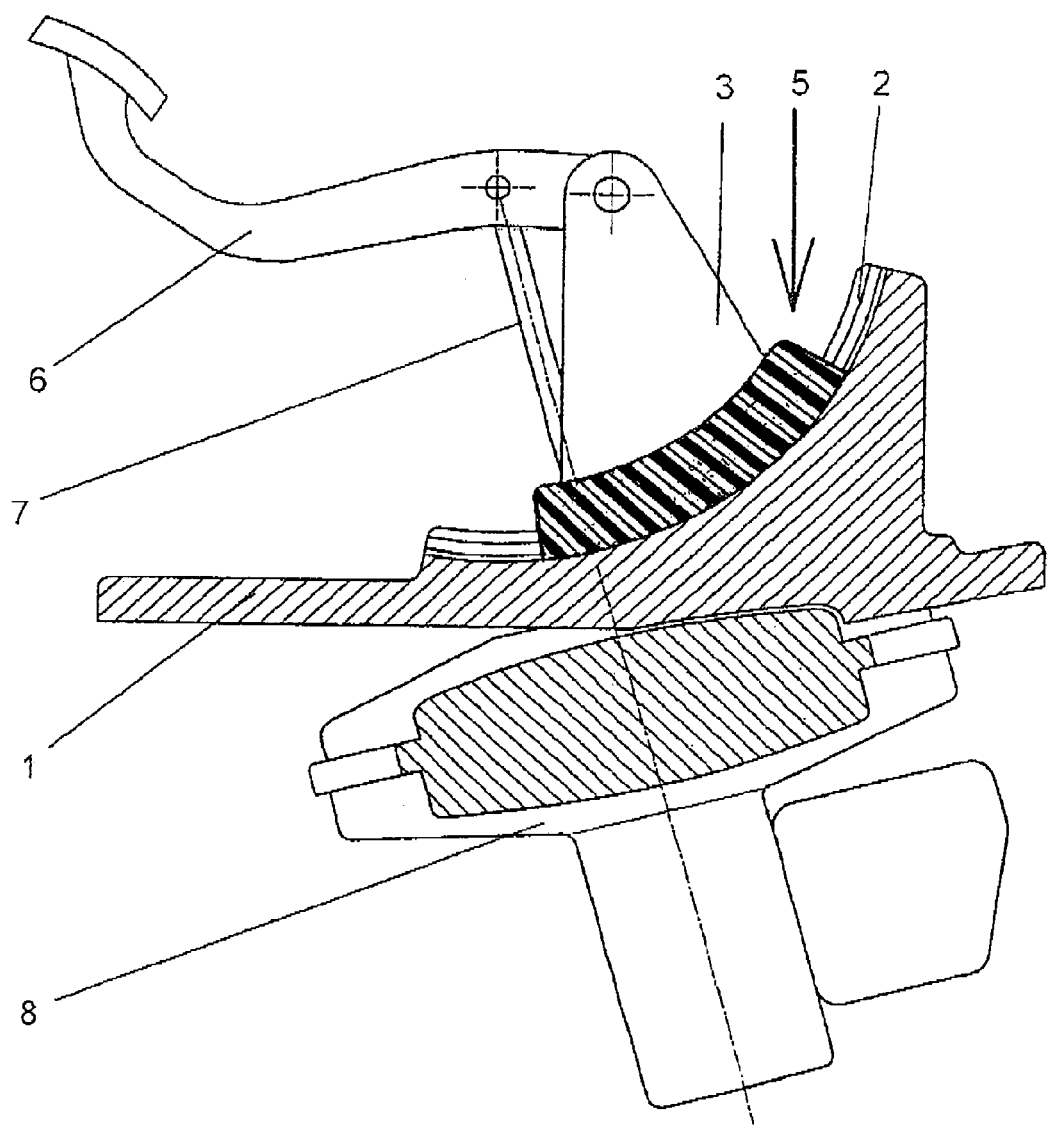
FIG. 3 is a sectional view D—D through the adjusting device.

FIG. 3 shows section 3—3 through a guide groove 2 in a view corresponding to that in FIG. 2. In addition to FIG. 2, the guide groove 2 can be seen here in the baseplate 1 along which the bearing shell 3 is movable.

Figure 4:
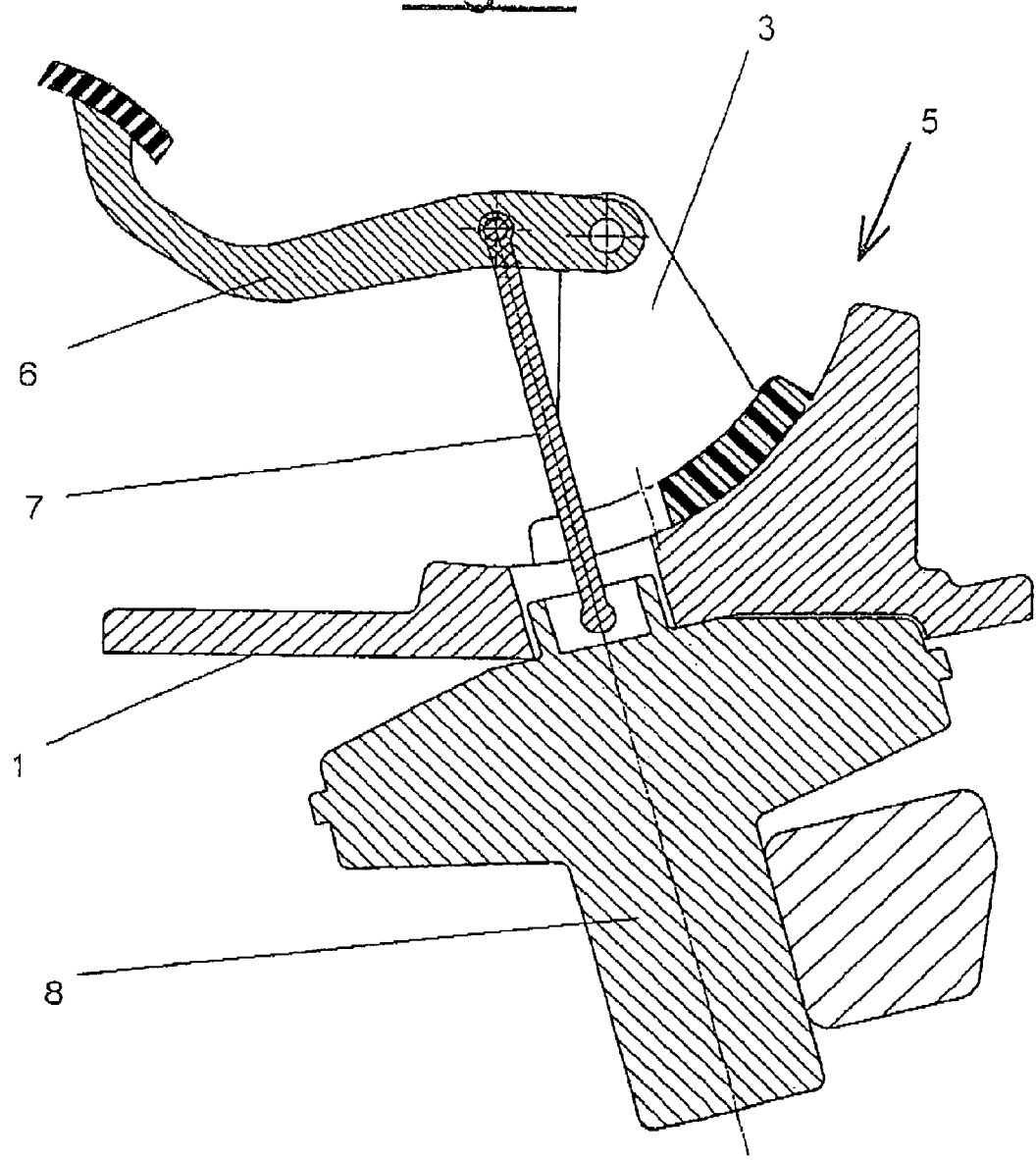
FIG. 4 is a sectional view C—C through the adjusting device.

FIG. 4 shows section 4—4 through the connecting piece 6 in a view corresponding to that in FIG. 2. In addition to FIG. 2, the mounting of the transmission unit 7 at the force transmission unit 8 can be seen here. Due to the fact that the fulcrum point of the connecting piece 6 of the movable mounting means 5 and the axis of the connection bolt between the movable mounting means 5 and the transmission unit 7 coincide, the transmission unit 7 maintains the same position during the adjustment of the movable bearing shell 3, i,e., it is stationary.

Figure 5:
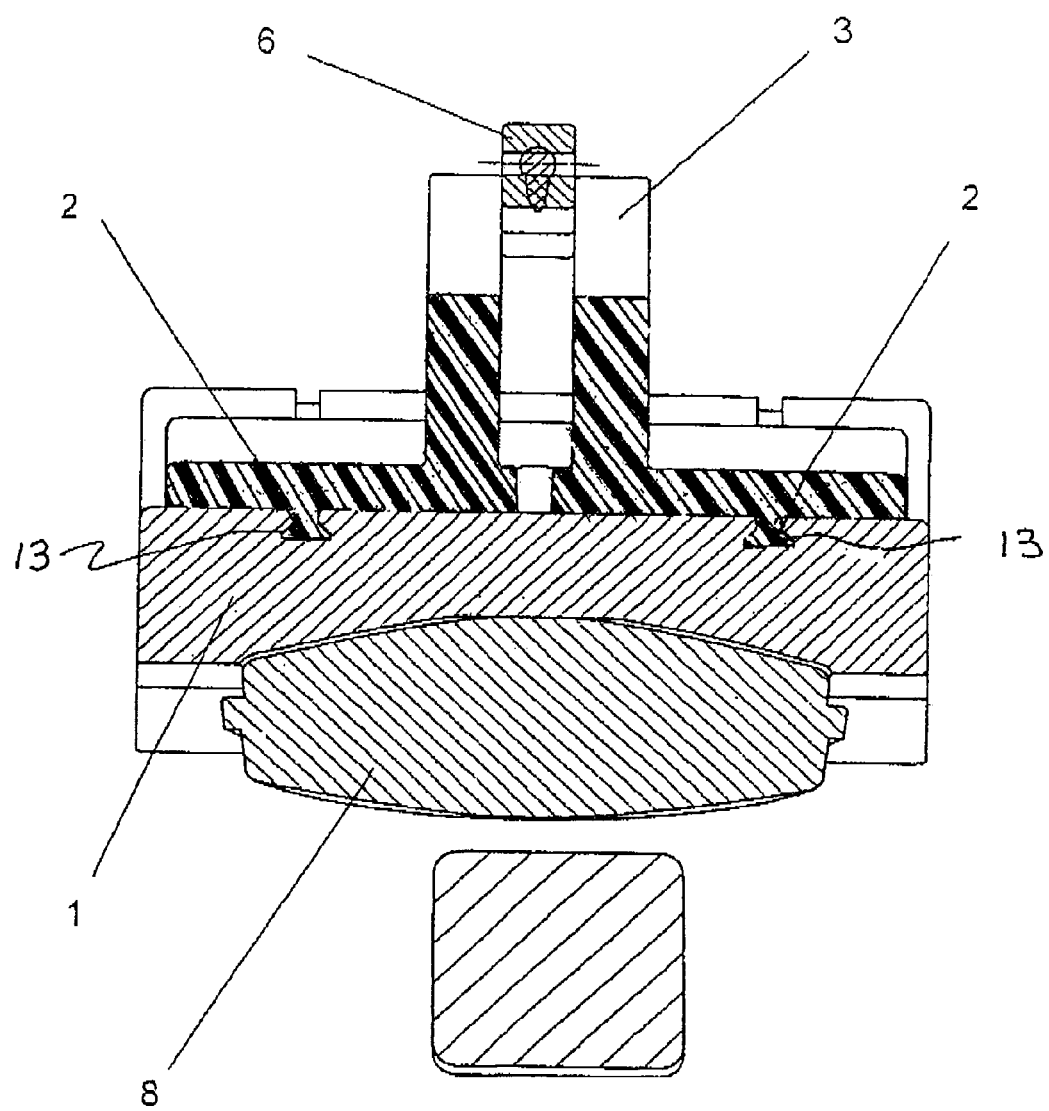
FIG. 5 is a sectional view E—E through the adjusting device.

FIG. 5 shows section 5—5. The two guide grooves 2 of the bearing shell 3, which are designed as dovetail guide grooves, can be recognized. Furthermore, the elevation formed centrally on the bearing shell 3 with the gap-like, central intermediate space, in which the connecting piece 6 is mounted, can be recognized.

Figure 6:
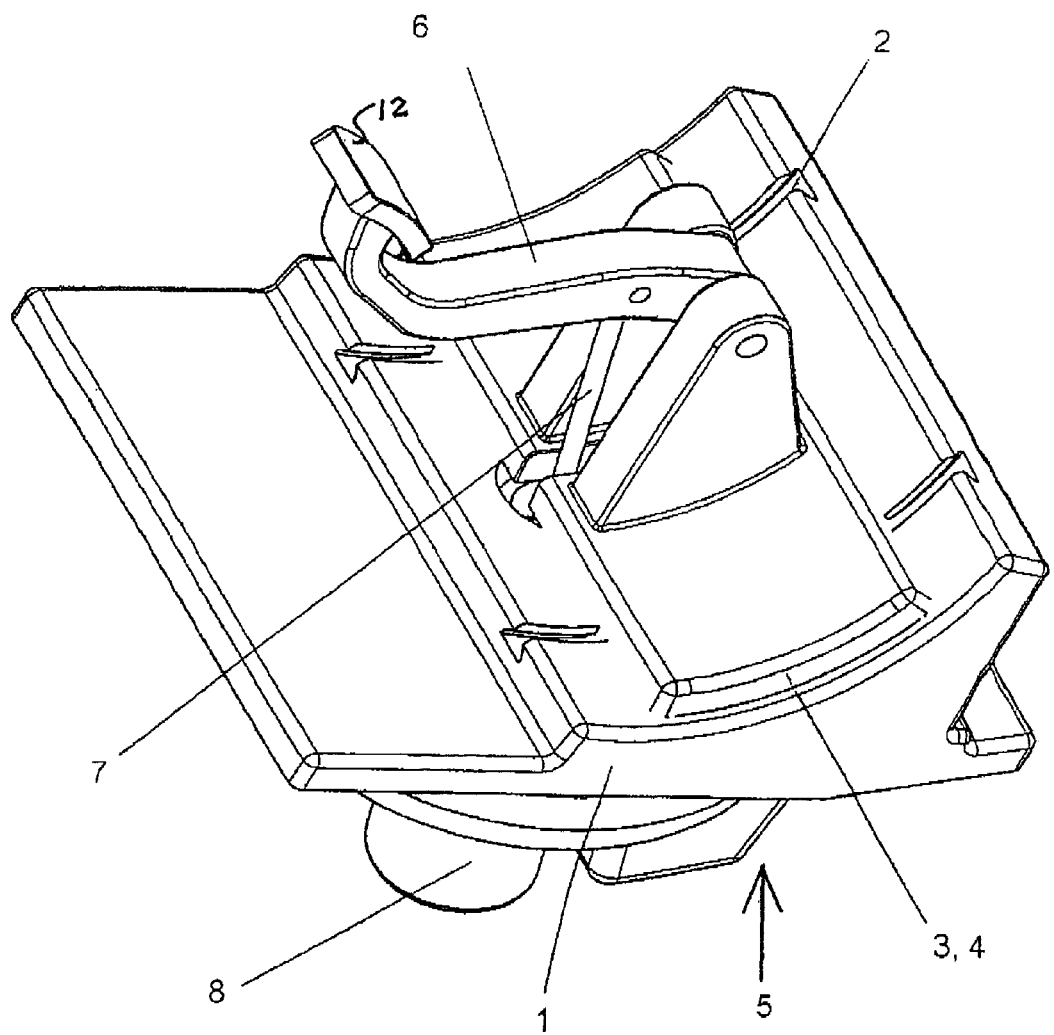
FIG. 6 is an isometric view of the adjusting device.

FIG. 6 shows an isometric view of the entire device. The cylindrical shape of the elevation of the baseplate 1, along which the bearing shell 3 can be moved in the guide grooves 2, can be recognized here.

While specific embodiments of the invention have been shown and described in detail to illustrate the application of the principles of the invention, it will be understood that the invention may be embodied otherwise without departing from such principles.

The invention claimed is:

1. An adjusting device for a vehicle actuator, the device comprising:
    an actuator connecting piece with an actuatable portion;
    a transmission unit for transmitting the movement of said actuator connecting piece, said transmission unit being coupled to said actuator connecting piece at a pivot connection;
    a base plate arranged stationarily at a vehicle;
    a bearing shell supporting said connecting piece, said bearing shell and said base plate defining a mounting device;
    an adjusting mechanism forming a part of said mounting device, said adjusting mechanism including a bulged area extending circumferntially at a radial distance from said pivot connection, with said bulged area having a surface with recesses defining guide grooves having a dovetail cross section and projections engaged in respective said guide grooves having a complementary dovetail cross section, said projections engaged in respective said guide grooves providing a movable connection of said bearing shell to said baseplate, with said bearing shell movable along said baseplate in a guided manner such that the position of said pivot connection remains unchanged during an adjustment of a position of said actuatable portion of said actuator connecting piece via movement of said bearing shell relative to said baseplate.

2. A device in accordance with claim 1, wherein said actuator connecting piece is a pedal of a motor vehicle.

3. A device in accordance with claim 2, wherein said transmission unit comprises a push rod connected to said actuator connecting piece via a push rod bolt forming said pivot connection.

4. A vehicle pedal adjusting device, comprising:
    a vehicle pedal with an actuatable portion;
    a transmission unit part for transmitting the movement of said vehicle pedal to a brake force transmission unit, said transmission unit part being coupled to said vehicle pedal at a pivot connection;
    a base plate arranged stationarily at a vehicle with an elevation having a bulged area having a surface extending circumferntially at a radial distance from said pivot connection with recesses defining guide grooves each having a dovetail cross section;
    a bearing shell pivotably supporting said vehicle pedal, said bearing shell and said base plate defining a mounting device, said bearing shell including projections engaged in respective said guide grooves and having a complementary dovetail cross section, said projections being engaged in respective said guide grooves to define an adjusting mechanism forming a part of said mounting device and providing a movable connection of said bearing shell to said baseplate, said bearing shell being movable along said baseplate in a guided manner such that the position of said pivot connection remains unchanged during an adjustment of a position of said actuatable portion of said vehicle pedal via movement of said bearing shell relative to said baseplate.

5. A device in accordance with claim 4, wherein said transmission unit part comprises a push rod connected to said pedal via a push rod bolt forming said pivot connection.

* * * * *